United States Patent
Gwon et al.

(10) Patent No.: US 9,623,829 B2
(45) Date of Patent: Apr. 18, 2017

(54) SIDE AIRBAG MODULE FOR VEHICLE

(71) Applicant: AUTOLIV DEVELOPMENT AB, Vårgårda (SE)

(72) Inventors: Tae Ik Gwon, Osan-si (KR); Soon Bok Lee, Yongin-si (KR); Do Hun Kim, Hwaseong-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/382,345

(22) PCT Filed: Feb. 20, 2013

(86) PCT No.: PCT/KR2013/001300
§ 371 (c)(1),
(2) Date: Sep. 2, 2014

(87) PCT Pub. No.: WO2013/137565
PCT Pub. Date: Sep. 19, 2013

(65) Prior Publication Data
US 2015/0048602 A1 Feb. 19, 2015

(30) Foreign Application Priority Data
Mar. 14, 2012 (KR) .................. 10-2012-0026303

(51) Int. Cl.
*B60R 21/233* (2006.01)
*B60R 21/207* (2006.01)
(Continued)

(52) U.S. Cl.
CPC .......... *B60R 21/233* (2013.01); *B60R 21/207* (2013.01); *B60R 21/2342* (2013.01);
(Continued)

(58) Field of Classification Search
CPC ............ B60R 21/233; B60R 21/23308; B60R 21/207; B60R 2021/23146; B60R 2021/0058
See application file for complete search history.

(56) References Cited

U.S. PATENT DOCUMENTS 5,575,497 A * 11/1996 Suyama et al. ............ 280/730.1
5,730,464 A * 3/1998 Hill ............................ 280/743.2
(Continued)

FOREIGN PATENT DOCUMENTS

| DE | 102009021635 A1 * | 11/2010 | .......... B60R 21/207 |
| JP | 2004-009790 A | 1/2004 | |
| JP | 2008-201172 A | 9/2008 | |

OTHER PUBLICATIONS

International Search Report and Written Opinion of the ISA for PCT/KR2013/001300, ISA/KR, mailed May 29, 2013.

*Primary Examiner* — James English
(74) *Attorney, Agent, or Firm* — Stephen T. Olson; Harness, Dickey & Pierce, P.L.C.

(57) ABSTRACT

A side airbag module for a vehicle includes an airbag cushion and an inflator to supply gas to the airbag cushion to deploy the airbag cushion. The airbag cushion includes first and second regions to protect a shoulder and a chest of an occupant, respectively, and, when the airbag cushion is initially deployed by driving of the inflator, the first region pushes the shoulder of the occupant toward an interior of a vehicle so that a portion of load applied from the second region to the chest of the occupant is moved to the shoulder of the occupant. When the airbag cushion is initially deployed due to vehicle collision, the shoulder of the occupant is pushed toward the interior of the vehicle to move the load applied to the chest of the occupant to the shoulder of the occupant, thereby minimizing the injury degree of the occupant.

16 Claims, 5 Drawing Sheets

(51) Int. Cl.
  *B60R 21/2342*  (2011.01)
  *B60R 21/26*    (2011.01)
  *B60R 21/231*   (2011.01)
  *B60R 21/00*    (2006.01)

(52) U.S. Cl.
  CPC ........ *B60R 21/23138* (2013.01); *B60R 21/26* (2013.01); *B60R 2021/0044* (2013.01); *B60R 2021/0058* (2013.01); *B60R 2021/23146* (2013.01); *B60R 2021/23308* (2013.01)

(56) References Cited

U.S. PATENT DOCUMENTS

| | | | | |
|---|---|---|---|---|
| 5,791,685 | A * | 8/1998 | Lachat et al. | 280/743.1 |
| 5,890,732 | A * | 4/1999 | Nakamura et al. | 280/729 |
| 5,927,750 | A * | 7/1999 | Nakamura et al. | 280/730.2 |
| 6,142,517 | A * | 11/2000 | Nakamura et al. | 280/739 |
| 7,819,421 | B2 * | 10/2010 | Naito et al. | 280/730.2 |
| 7,891,704 | B2 | 2/2011 | Taguchi et al. | |
| 7,954,846 | B2 | 6/2011 | Iwayama et al. | |
| 8,033,570 | B2 * | 10/2011 | Sato et al. | 280/730.2 |
| 8,322,747 | B2 * | 12/2012 | Shankar | 280/729 |
| 8,419,060 | B2 * | 4/2013 | Yamamoto et al. | 280/743.2 |
| 8,448,981 | B2 * | 5/2013 | Fukawatase | 280/730.2 |
| 8,534,702 | B2 * | 9/2013 | Suzuki | 280/730.2 |
| 8,562,015 | B2 * | 10/2013 | Yamamoto | 280/729 |
| 8,651,515 | B2 * | 2/2014 | Baba et al. | 280/730.2 |
| 8,777,257 | B2 * | 7/2014 | Fukawatase et al. | 280/730.2 |
| 8,783,712 | B2 * | 7/2014 | Fukushima et al. | 280/730.2 |
| 2012/0038135 | A1 | 2/2012 | Oomori et al. | |
| 2012/0217730 | A1 * | 8/2012 | Baba et al. | 280/729 |
| 2013/0229003 | A1 * | 9/2013 | Fukawatase et al. | 280/730.2 |
| 2014/0091562 | A1 * | 4/2014 | Sugimoto | 280/743.1 |

* cited by examiner

SIDE AIRBAG MODULE FOR VEHICLE

CROSS-REFERENCE TO RELATED APPLICATIONS

This application is a 371 U.S. National Stage of International Application No. PCT/KR2013/001300, filed Feb. 20, 2013, which claims priority to Korean Patent Application No. 10-2012-0026303, filed Mar. 14, 2012. The disclosures of the above applications are incorporated herein by reference.

TECHNICAL FIELD

The present invention relates to a side airbag module for a vehicle. In more particular, the present invention relates to a side airbag module for a vehicle, capable of minimizing the injury degree of an occupant by moving a portion of the load applied to the chest of the occupant to the shoulder of the occupant when an airbag cushion is deployed due to vehicle collision.

BACKGROUND ART

In general, airbag systems are devices to protect an occupant in a vehicle by absorbing physical impact caused upon vehicle collision using the elasticity of an airbag cushion. The airbag systems may be classified into a driver airbag system, a passenger airbag system, and a side airbag system.

The side airbag system is generally installed at a seat or a pillar of a vehicle to prevent the head and the shoulder of an occupant from colliding with the door, prevent the occupant from being injured by fragments of a broken door window, or prevent the occupant from being sprung out of a vehicle body when the occupant is inclined to the door or the door is dented inward upon the side collision of the vehicle.

Figure 1:
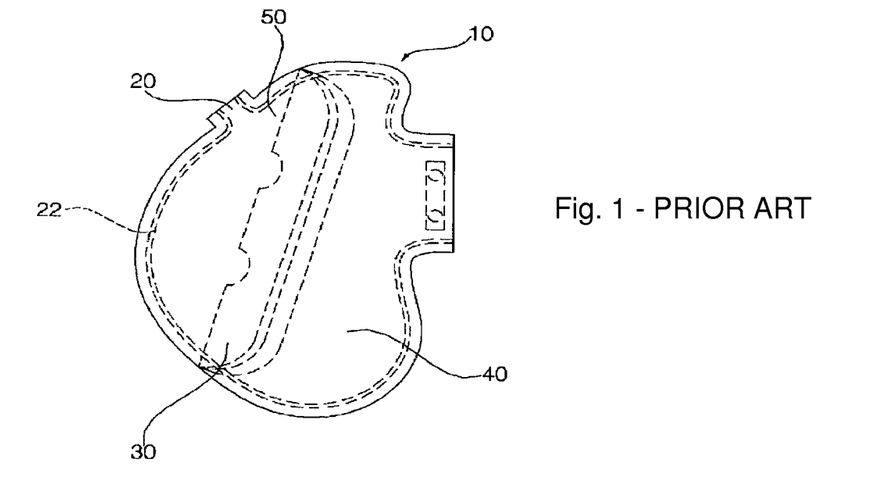
FIG. 1 is a prior art side view showing a side airbag cushion according to the related art.

Hereinafter, a side airbag cushion according to the related art will be described with reference to FIG. 1.

An airbag cushion 10 employed in an airbag system according to the related art may be partitioned into a lower chamber 40 to protect the hip of an occupant and an upper chamber 50 to protect the chest and the shoulder of the occupant. The lower chamber 40 is distinguished from the upper chamber 50 by an internal baffle 30, and the internal baffle 30 is provided therein with a through hole (in the shape of a semicircle in FIG. 1) used to supply gas from the lower chamber 40 to the upper chamber 50. In addition, the upper chamber 50 is provided therein with a vent hole 20 to exhaust gas to the outside after a predetermined gas pressure has been made in the upper and lower chambers 50 and 40.

In the above structure, gas is primarily introduced into the lower chamber 40 by the explosion of an inflator (not shown) to inflate the lower chamber 40, and introduced into the upper chamber 50 via the through hole to inflate the upper chamber 50.

However, according to the related art, in the state that the internal space of the upper chamber 50 communicates with the internal space of the lower chamber 40 by the through hole formed in the baffle 30, if the upper and lower chambers 50 and 40 are inflated beyond a predetermined extent, the gas is exhausted to the outside through the vent hole 20. Accordingly, the deployment volume of the upper and lower chambers 50 and 40 is gradually reduced.

Meanwhile, the shoulder of the occupant may be less injured than the chest of the occupant in the body structure of a person. Accordingly, researches and development are required for the structure of an airbag cushion capable of more minimizing the injury degree of the occupant by moving a portion of the load (impact) applied to the weaker chest of the occupant to the shoulder of the occupant.

However, according to the airbag cushion 10 of the related art, since the upper chamber 50 that may make contact with the shoulder of the occupant has no structure to especially push the shoulder of the occupant toward the interior of the vehicle, the above load distribution may not occur. In this case, since the load applied to the chest of the occupant is not properly distributed upon vehicle collision, the rib of the occupant may be injured.

DISCLOSURE OF INVENTION

Technical Problem

Accordingly, the present invention has been made keeping in mind the above problems occurring in the prior art, and an object of the present invention is to provide a side airbag module for a vehicle, capable of minimizing the injury degree of an occupant by moving a portion of the load applied to the chest of the occupant to the shoulder of the occupant.

In addition, another object of the present invention is to provide a side airbag module for a vehicle, in which the side airbag module can be easily manufactured so that the manufacturing cost is not increased greatly, and the load can be prevented from being concentrated on the chest of the occupant, so that the injury degree of the occupant can be minimized.

Objects of the present invention may not be limited to the above, and other objects of the present invention will be apparently comprehended by those skilled in the art when making reference to embodiments in the following description.

Solution to Problem

In order to accomplish the above objects, according to the present invention, there is provided a side airbag module for a vehicle, which includes an airbag cushion and an inflator to supply gas to the airbag cushion to deploy the airbag cushion. The airbag cushion includes a first region to protect a shoulder of an occupant and a second region to protect a chest of the occupant, and, when the airbag cushion is initially deployed by driving of the inflator, the first region pushes the shoulder of the occupant toward an interior of a vehicle so that a portion of load applied from the second region to the chest of the occupant is moved to the shoulder of the occupant.

In this case, the first region may be partitioned from the second region by an upper baffle provided in the airbag cushion.

The first region may have a shape of a chamber separated from the second region, and a portion of an edge of the first region may be attached to an upper edge of the second region so that a portion of the first region can be overlapped with an upper portion of the second region to more increase a deployment thickness of a region contactable with the shoulder of the occupant when the airbag cushion is deployed.

The first region may be linked with the second region at one point of a contact region between the first region and the second region or in a predetermined section of the contact region through a sewing scheme.

The first region may have a shape of a chamber separated from the second region, and a deployment width of the first region may be less than a deployment width of the second region when the deployed airbag cushion is viewed in a lateral direction.

The airbag cushion further may include a third region to protect a hip of the occupant, and the third region may be partitioned from the second region by a lower baffle provided in the airbag cushion.

Advantageous Effects of Invention

The side airbag module for the vehicle according to the embodiment of the present invention has following effects.

First, when the airbag cushion is initially deployed due to vehicle collision, the shoulder of the occupant is pushed toward the interior of the vehicle, so that a portion of the load applied to the chest of the occupant is moved to the shoulder of the occupant, thereby minimizing the injury degree of the occupant.

Second, when the airbag cushion is initially deployed, the shoulder of the occupant is pushed to the interior of the vehicle to delay a predetermined time taken until the second region makes contact with the chest of the occupant, thereby preventing load from being concentrated on the chest of the occupant.

Third, the side airbag module having the simple structure can be easily manufactured, and a portion of the load to be concentrated on the chest of the occupant can be moved to the shoulder of the occupant, thereby minimizing the injury degree of the occupant.

Effects of the present invention may not be limited to the above, and other objects of the present invention will be apparently comprehended by those skilled in the art when making reference to embodiments in the following description.

MODE FOR THE INVENTION

Hereinafter, exemplary embodiments of the present invention will be described in detail with reference to accompanying drawings. However, the present invention is not limited to the following embodiments, but various modifications may be realized. The present embodiments are provided to make the disclosure of the present invention perfect and to make those skilled in the art perfectly comprehend the scope of the present invention. The same reference numerals will be used to refer to the same elements.

In a side airbag module (hereinafter, airbag module) for a vehicle according to exemplary embodiments of the present invention, when an airbag cushion is deployed, the shoulder of an occupant is pushed with a predetermined pressure, so that a portion of the load to be concentrated on a body (chest) of the occupant can be moved to the shoulder of the occupant. In addition, according to the present embodiment, when the airbag cushion is deployed, a time taken until a portion of the airbag cushion makes contact with the chest (ribs) of the occupant is delayed, so that a time taken until the chest of the occupant makes contact with a door trim of a vehicle can be actually extended. As described above, according to the present embodiment, a portion of the load to be concentrated on the chest of the occupant not only be moved, but the time taken until the airbag cushion makes contact with the chest of the occupant is delayed, thereby minimizing the injury degree of the occupant.

Hereinafter, an airbag module according to the present embodiment will be described by using various examples.

Figure 2:
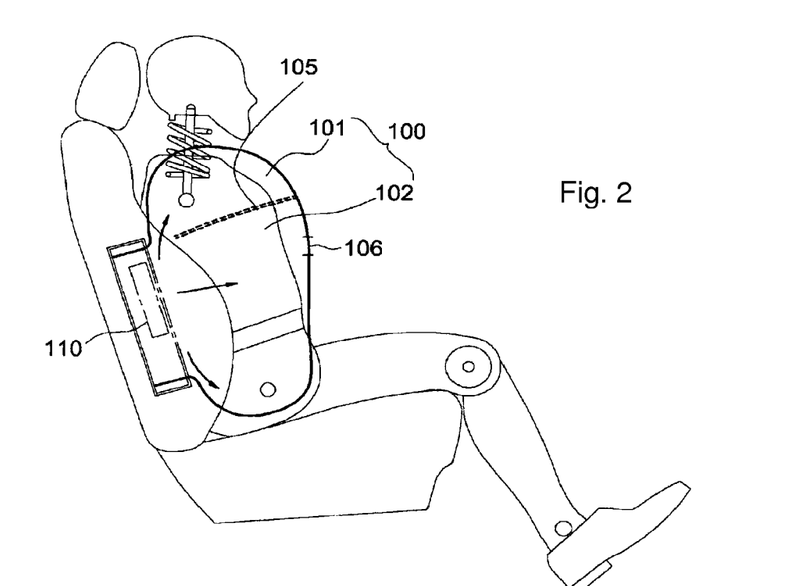
FIG. 2 is a side view showing the deployment state of a side airbag module for a vehicle according to a first embodiment of the present invention.
Figure 3:
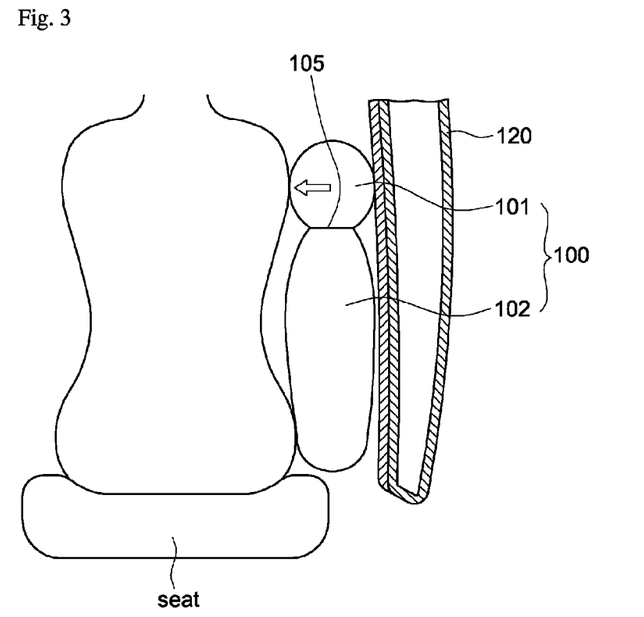
FIG. 3 is a rear view showing the deployment state of the side airbag module for the vehicle according to the first embodiment of the present invention.

FIG. 2 is a side view showing the deployment state of the side airbag module for the vehicle according to the first embodiment of the present invention, and FIG. 3 is a rear view showing the deployment state of the side airbag module for the vehicle according to the first embodiment of the present invention.

As shown in FIGS. 2 and 3, the airbag module according to the first embodiment of the present invention includes an airbag cushion 100 and an inflator 110 to supply gas into the airbag cushion 100 to deploy the airbag cushion 100. In this case, the procedure of deploying the airbag cushion 100 by the explosion of the inflator 110 is generally known to those skilled in the art, and thus the details thereof will be omitted.

According to the present embodiment, the airbag cushion 100 includes a first region 101 and a second region 102. In this case, the first region 101 serves as an upper portion to protect the shoulder of an occupant, and the second region 102 serves as a middle portion to protect the chest of the occupant. The second region 102 may protect the hip of the occupant. Hereinafter, the airbag cushion 100 will be described by using the terms first region 101 and second region 102.

According to the present embodiment, when the airbag cushion 100 is initially deployed by the explosion of the inflator 110, the gas pressure inside the first region 101 is sufficiently maintained for a predetermined time, so that the shoulder of the occupant can be pushed toward the interior of the vehicle. In other words, the first region 101 pushes the shoulder of the occupant with a predetermined pressure so that load applied to the body of the occupant from the second region 102 can be reduced. In detail, the concentration of the load onto the body of the occupant from the second region 102 can be minimized. Therefore, according to the present embodiment, the time taken until the body of the occupant makes contact with the second region 102 and the time taken until the body of the occupant makes contact with the door trim of the vehicle are delayed, so that the injury degree of the occupant can be reduced. Reference numeral 120, which is not described, represents a vehicle door.

As shown in FIGS. 2 and 3, according to the present embodiment, the second region 102 has the form of an integral chamber, but the present invention is not limited thereto. In other words, the internal space of the second region 102 may be partitioned by a baffle (not shown) provided in the airbag cushion 100. In this case, a lower portion of the second region 102 may protect the hip of the occupant. In addition, the baffle (not shown) may be attached onto the facing inner surfaces of the first and second panels constituting the airbag cushion 100 through a sewing scheme or by using an adhesive.

According to the present embodiment, the first region 101 can be partitioned from the second region 102 by an upper baffle 105 provided in the airbag cushion 100. The upper baffle 105 may be attached onto the inner surfaces of the first and second panels.

In the above structure, if the inflator 110 is operated, gas is introduced into the first region 101 and the second region 102, so that the airbag cushion 100 is deployed.

According to the present embodiment, the first region 101 is provided at an upper portion of the airbag cushion 100 corresponding to the shoulder of the occupant while being partitioned from the second region 102 through the upper baffle 105, so that the first region 101 can be maintained at a predetermined internal gas pressure when the inflator 110 is operated. The first region 101 of the airbag cushion 100 pushes the shoulder of the occupant toward the interior of the vehicle positioned in opposition to the vehicle door to increase the delay time, so that the injury degree of the occupant can be minimized.

In addition, according to the present embodiment, the second region 102 is provided therein with a vent hole 106 to exhaust the gas out of the second region 102, and the vent hole is not provided in the first region 101. Therefore, when the airbag cushion 100 is deployed, the inflated state of the first region 101 can be maintained for a longer time as compared with the inflated state of the second region 102. In addition, when the airbag cushion 100 is initially deployed, the first region 101 instantly pushes the shoulder of the occupant toward the interior of the vehicle to more increase a time taken until the occupant makes contact with the door trim, so that the injury degree of the occupant can be reduced.

As described above, the pushing of the shoulder of the occupant by the first region 101 may be comprehended as a meaning that, in order to prevent the occupant from being excessively inclined toward the door trim in the initial stage of vehicle collision, the first region 101 instantly stops the current movement direction of the shoulder of the occupant (door trim direction) when the first region 101 filled with gas makes contact with the shoulder of the occupant, and then instantly pushes the shoulder of the occupant in the direction opposite to the door trim direction.

As described above, according to the first embodiment of the present invention, the structure is simple, so that the manufacturing work can be easily performed, and the load can be prevented from being concentrated onto the chest of the occupant, so that the injury degree of the occupant can be minimized.

Hereinafter, an airbag module according to a second embodiment of the present invention will be described.

Figure 4:
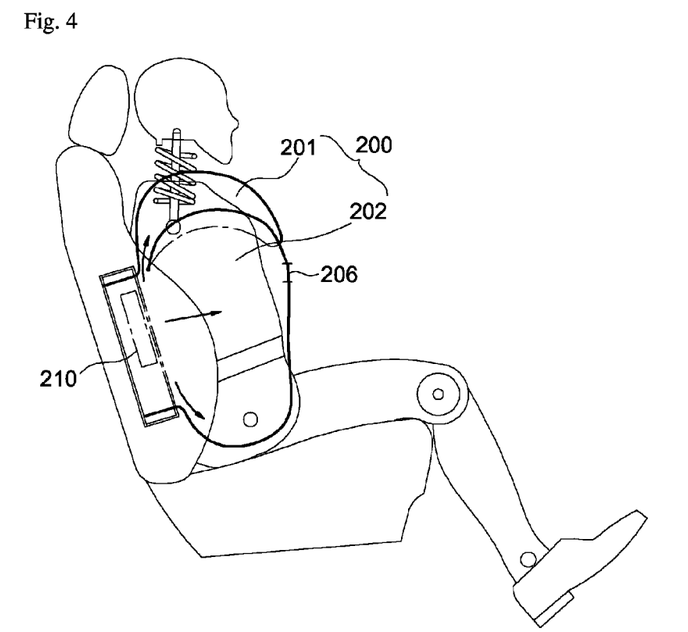
FIG. 4 is a side view showing the deployment state of a side airbag module for a vehicle according to a second embodiment of the present invention.
Figure 5:
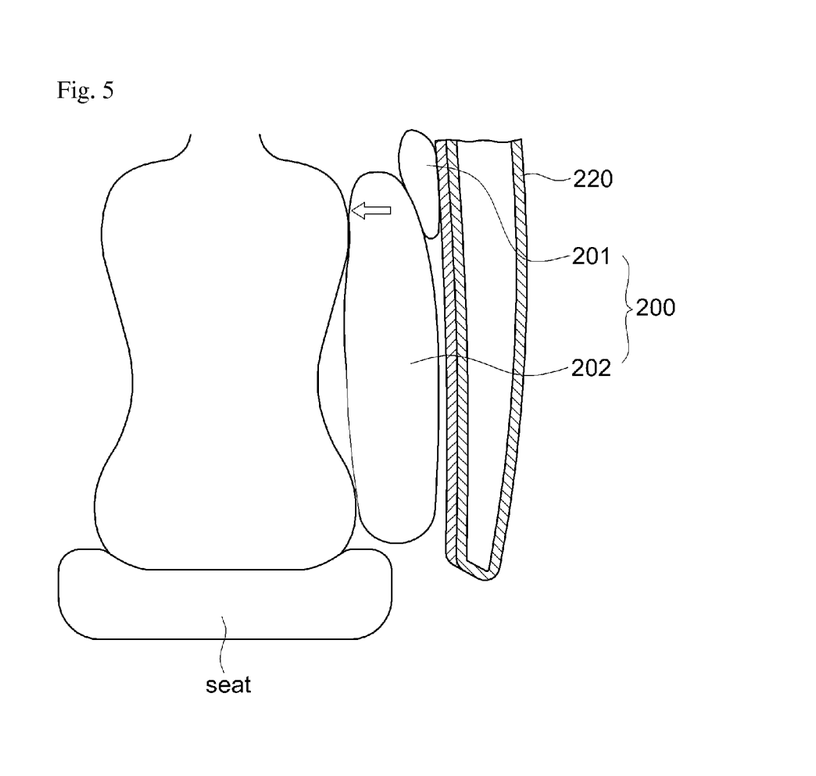
FIG. 5 is a rear view showing the deployment state of the side airbag module for the vehicle according to the second embodiment of the present invention.
Figure 6:
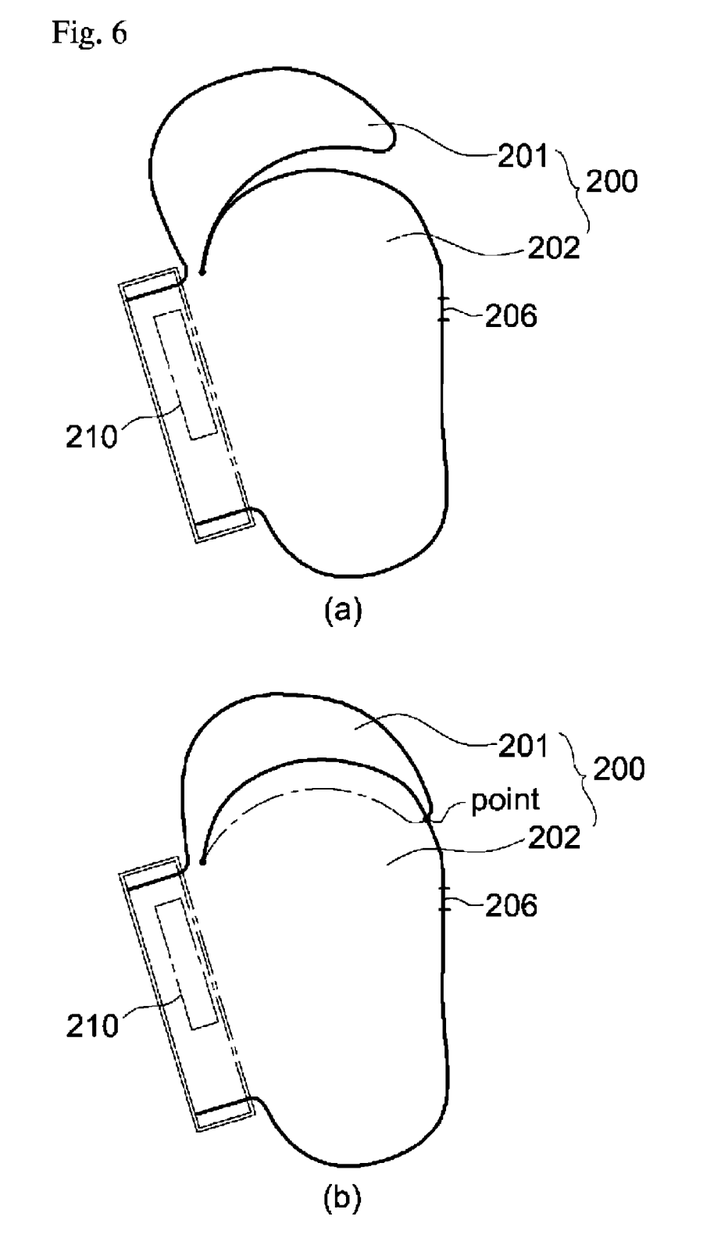
FIGS. 6(a) and 6(b) are side views showing a procedure of manufacturing the side airbag module for the vehicle according to the second embodiment of the present invention.

FIG. 4 is a side view showing the deployment state of a side airbag module for a vehicle according to a second embodiment of the present invention, FIG. 5 is a rear view showing the deployment state of the side airbag module for the vehicle according to the second embodiment of the present invention, and FIGS. 6(a) and 6(b) are side views showing a procedure of manufacturing the side airbag module for the vehicle according to the second embodiment of the present invention.

When the second embodiment of the present invention is described below, the structures and the components identical to those of the first embodiment will not be further described. In addition, the components identical to those of the first embodiment will be assigned with reference numerals of 200s.

As shown in FIGS. 4 to 6(b), similarly to the structure of the first embodiment, the airbag module according to the second embodiment of the present invention includes an airbag cushion 200 and an inflator 210 to supply gas into the airbag cushion 200 to deploy the airbag cushion 200.

In addition, the airbag cushion 200 includes a first region 201 to protect the shoulder of an occupant and a second region 202 to protect the chest of the occupant. According to the second embodiment of the present invention, similar to the first embodiment, the internal space of the second region 202 is not partitioned by a baffle.

However, different from the first embodiment, the first region 201 has the shape of a chamber provided separately from the second region 202. In detail, first, a worker cuts out the first and second panels constituting the airbag cushion 200 in the shape shown in FIG. 6(a) and sewing the first and second panels along the edges thereof. In this case, the first region 201 has the shape of a chamber separated from the second region 202.

Thereafter, as shown in FIG. 6(b), the worker attaches a portion of the edge of the first region 201 to an upper edge of the second region 202. In this case, the first region 201 may be attached to the second region 202 through a sewing scheme or by using an adhesive. In detail, the first region 201 is attached to the second region 202 in such a manner that the portion (lower portion) of the first region 201 is overlapped with the upper portion of the second region 202. For one example, according to the present embodiment, the first region 201 may be attached to the second region 202 through the sewing scheme or an adhesive at one point in which the first and second regions 201 and 202 may be in the mutual contact with each other. For another example, the first region 201 may be attached to the second region 202 through the sewing scheme or an adhesive in a predetermined section in which the first and second regions 201 and 202 may be in the mutual contact with each other. In this case, the predetermined section refers to a substantially straight line section having a predetermined length, or a substantially curved section. Although FIG. 6(b) shows that the first region 201 is attached to the second region 202 at the point through the former scheme, the present invention is not limited thereto. In other words, the first region 201 may be attached to the second region 202 through the latter scheme.

Through the above structure, the deployment thickness of the airbag cushion 200 is more increased in a region that may make contact with the shoulder of the occupant when the airbag cushion 200 is deployed. In detail, as shown in FIG. 5, when viewing the occupant at the front of the occupant, the lower portion of the first region 201 is mutually overlapped (folded) with the upper portion of the second region 202, and the overlapped region pushes the shoulder of the occupant. Accordingly, the airbag cushion 200 according to the second embodiment can more strongly push the shoulder of the occupant than the airbag cushion 100 according to the first embodiment. In detail, the sum of the gas pressure inside the first region 201 and the gas pressure of the upper portion of the second region 202 overlapped with the first region 201 is applied (pushed) to the shoulder of the occupant, and the pushing force is more increased than the pushing force according to the first embodiment.

Therefore, according to the present embodiment, similarly to the first embodiment, the concentration of the load from the second region 202 on the body of the occupant can be minimized. Therefore, according to the present embodiment, the time taken until the body of the occupant makes contact with the second region 202 and the time taken until the body of the occupant makes contact with the door trim (not shown) of the vehicle are delayed, so that the injury degree of the occupant can be reduced.

Hereinafter, an airbag module according to the third embodiment of the present invention will be described.

Figure 7:
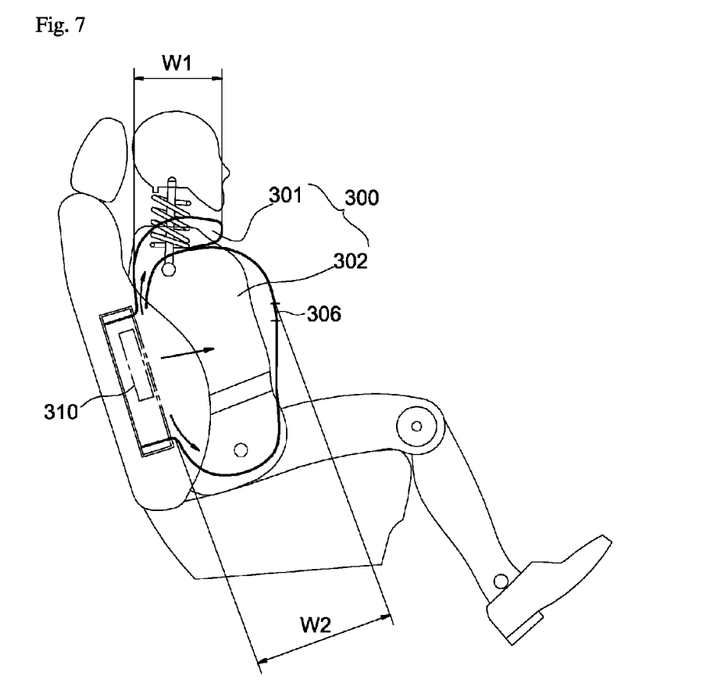
FIG. 7 is a side view showing the deployment state of a side airbag module for a vehicle according to a third embodiment of the present invention.
Figure 8:
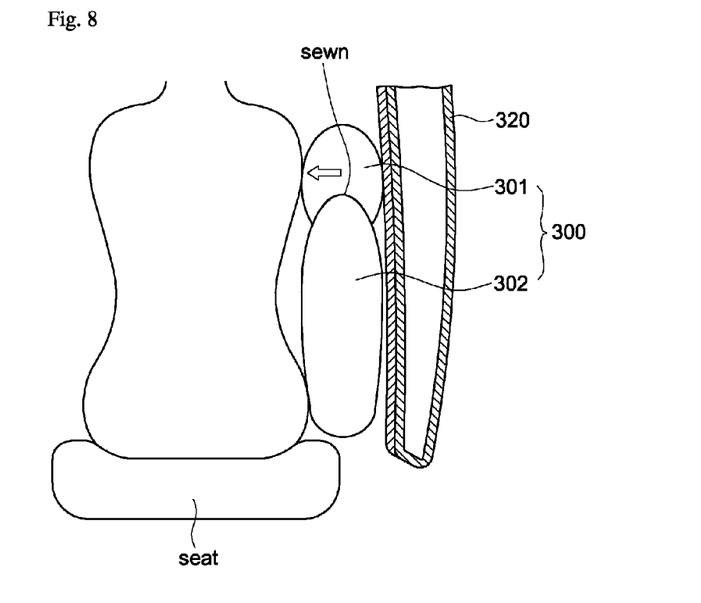
FIG. 8 is a rear view showing the deployment state of the side airbag module for the vehicle according to the third embodiment of the present invention.

FIG. 7 is a side view showing the deployment state of a side airbag module for a vehicle according to a third embodiment of the present invention, and FIG. 8 is a rear view showing the deployment state of the side airbag module for the vehicle according to the third embodiment of the present invention.

When the third embodiment of the present invention is described below, the structures and the components identical to those of the first embodiment will not be further described. In addition, the components identical to those of the first embodiment will be assigned with reference numerals of 300s.

As shown in FIGS. 7 and 8, similarly to the structure of the first embodiment, the airbag module according to the third embodiment of the present invention includes an airbag cushion 300 and an inflator 310 to supply gas into the airbag cushion 300 to deploy the airbag cushion 300.

In addition, the airbag cushion 300 includes a first region 301 to protect the shoulder of an occupant and a second region 302 to protect the chest of the occupant. In this case, similarly to the first and second embodiments, the second region 302 has one internal space. However, the present invention is not limited thereof. In other words, the second region 302 may be partitioned into a plurality of spaces by a baffle (not shown).

However, different from the first embodiment, the first region 301 has the shape of a chamber separated from the second region 302. In detail, first, a worker cuts out the first and second panels constituting the airbag cushion 300 in a preset shape and sewing the first and second panels along the edges thereof. In this case, the first region 301 has the shape of a chamber separated from the second region 302.

According to the third embodiment of the present invention, as shown in FIG. 7, when the airbag cushion 300 is deployed, a deployment width W1 of the first region 301 is less than a deployment width W2 of the second region 302. The term deployment width refers to the horizontal width of the first region 301 or the second region 302 when the airbag cushion 300 is viewed in the lateral direction of the occupant.

In detail, the first region 301 has a rounded upper end portion, and has the deployment width less than the deployment width of the second region 302 as described above, to more strongly push the shoulder of the occupant. In addition, in the state that the inflator 310 is operated, as the volume of the first region 301 is reduced, the internal pressure of the first region 301 is increased. Accordingly, the first region 301 can more strongly push the shoulder of the occupant due to the increase of the internal pressure.

Therefore, according to the present embodiment, similarly to the first and second embodiments, the concentration of the load from the second region 302 on the body of the occupant can be minimized. Accordingly, according to the present embodiment, the time taken until the body of the occupant makes contact with the second region 302 and the time taken until the body of the occupant makes contact with the door trim (not shown) of the vehicle are delayed, so that the injury degree of the occupant can be reduced.

Meanwhile, although the first to third embodiments have been described in that the airbag cushion 100, 200, or 300 is partitioned into the first and second regions 301 and 302, the present invention is not limited thereto.

In detail, the airbag cushion 100, 200, or 300 includes a third region (not shown) to protect the hip of the occupant. The third region (not shown) serves as a lower portion to protect the hip of the occupant and may be partitioned from the second region 102, 202, or 302 by a lower baffle (not shown) provided in the airbag cushion 100, 200, or 300. As described above, the third region (not shown) is additionally provided in the airbag cushion 100, 200, or 300, so that the third region (not shown) firmly and rapidly supports the hip of the occupant upon vehicle collision, thereby preventing the occupant from being rapidly inclined to the door. In addition, the function of the first region 101, 201, or 301 to push the shoulder of the occupant toward the interior of the vehicle makes a synergy effect together with the function of the third region (not shown) to rapidly support the hip of the occupant, so that the injury degree of the occupant can be more minimized.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The invention claimed is:

1. A side airbag module for a vehicle, the side airbag module comprising:
   an airbag cushion; and
   an inflator to supply a gas to the airbag cushion to deploy the airbag cushion,
   wherein the airbag cushion includes a first region for protecting a shoulder of an occupant and a second region for protecting a chest of the occupant, the first region having a first deployment thickness in a width direction of the vehicle and the second region having a second deployment thickness in the width direction, the first deployment thickness being less than the second deployment thickness,
   wherein the first region is positioned above the second region, the first region is unvented and the second region is vented such that an inflated state of the first region is maintained longer than an inflated state of the second region,
   wherein the gas from the inflator is substantially simultaneously supplied to the first and second regions.

2. The side airbag module of claim 1, wherein the first region is partitioned from the second region by an upper baffle provided in the airbag cushion.

3. The side airbag module of claim 1, wherein the first region has a shape of a chamber separated from the second region, and a portion of an edge of the first region is attached to an upper edge of the second region so that a portion of the first region is overlapped with an upper portion of the second region to more increase a deployment thickness of a region contactable with the shoulder of the occupant when the airbag cushion is deployed.

4. The side airbag module of claim 3, wherein the first region is linked with the second region at one point of a contact region between the first region and the second region or in a predetermined section of the contact region through a sewing scheme.

5. The side airbag module of claim 1, wherein the first region has a shape of a chamber separated from the second region, and a deployment width of the first region is less than a deployment width of the second region when the deployed airbag cushion is viewed in a lateral direction.

6. The side airbag module of claim 1, wherein the airbag cushion further includes a third region to protect a hip of the occupant, and the third region is partitioned from the second region by a lower baffle provided in the airbag cushion.

7. A method of protecting an occupant of a vehicle, the method comprising:
providing a side airbag module including an airbag cushion having a first portion positioned above a second portion, the first portion being unvented and the second portion being vented;
inflating the airbag cushion with an inflator such that the first and second portions are substantially simultaneously inflated and further such that during initial deployment, gas pressure is maintained in the first portion for a predetermined time for pushing a shoulder of the occupant toward an interior of a vehicle and further such that the first portion has a first deployment thickness in a width direction of the vehicle and the second portion has a second deployment thickness in the width direction, the first deployment thickness being less than the second deployment thickness; and
maintaining an inflated state of the first portion longer than an inflated state of the second portion.

8. The side airbag module of claim 1, in combination with a vehicle seat, the airbag module mounted to a seatback of the vehicle seat.

9. The side airbag module of claim 1, wherein the airbag module is adapted to attach to a seatback of a vehicle seat.

10. The method of claim 7, further comprising venting air only from the second portion.

11. A side airbag module for a vehicle, the side airbag module comprising:
an airbag cushion; and
an inflator to supply gas to the airbag cushion to deploy the airbag cushion,
wherein the airbag cushion includes a first region for protecting a shoulder of an occupant and a second region for protecting a chest of the occupant, and, when the airbag cushion is initially deployed by driving of the inflator, the first region is operative to push the shoulder of the occupant toward an interior of a vehicle,
wherein the first region is positioned above the second region, the first region is unvented and the second region is vented such that an inflated state of the first region is maintained longer than an inflated state of the second region,
wherein the first region has a shape of a chamber separated from the second region, and a lower portion of the first region is overlapped with an upper portion of the second region such that the first region is interposed between the upper portion of the second region and a door of the vehicle.

12. A side airbag module for a vehicle, the side airbag module comprising:
an airbag cushion; and
an inflator to supply gas to the airbag cushion to deploy the airbag cushion,
wherein the airbag cushion includes a first region for protecting a shoulder of an occupant and a second region for protecting a chest of the occupant, and, when the airbag cushion is initially deployed by driving of the inflator, the first region is operative to push the shoulder of the occupant toward an interior of a vehicle,
wherein the first region is positioned above the second region, the first region is unvented and the second region is vented such that an inflated state of the first region is maintained longer than an inflated state of the second region,
wherein the first region has a shape of a chamber separated from the second region, and is formed in a shape corresponding to an upper end of the second region to be coupled to the upper end of the second region, and a deployment thickness in a width direction of the vehicle of the first region is less than a deployment thickness in a width direction of the vehicle of the second region, and a deployment width in a length direction of the vehicle of the first region is less than a deployment width in the length direction of the vehicle when the deployed airbag cushion is viewed in a lateral direction.

13. The side airbag module of claim 1, wherein when the airbag cushion is initially deployed by driving of the inflator, the first region is operative to push the shoulder of the occupant toward an interior of a vehicle and further operative to move a portion of the load applied from the second region from the chest of the occupant to the shoulder of the occupant.

14. The method of claim 7, wherein the first portion is further operative to move a portion of load applied from the second portion from a chest of the occupant to the shoulder of the occupant.

15. The side airbag module of claim 11, wherein the first portion is further operative to move a portion of load applied from the second region from the chest of the occupant to the shoulder of the occupant.

16. The side airbag module of claim 12, wherein the first portion is further operative to move a portion of load applied from the second region from the chest of the occupant to the shoulder of the occupant.

* * * * *